April 8, 1930.   L. G. MERRITT   1,753,384
GEAR BOX BRAKE
Filed Nov. 4, 1926
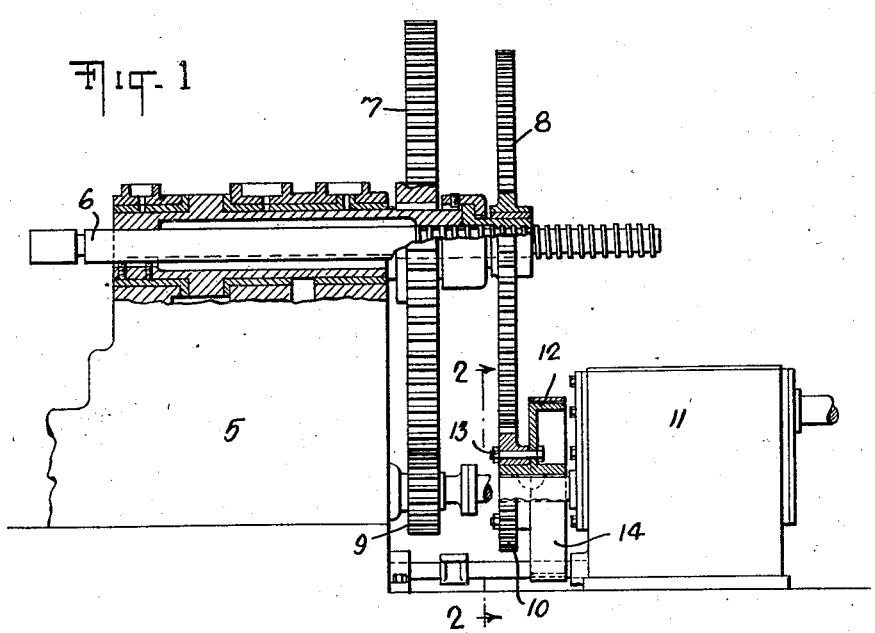
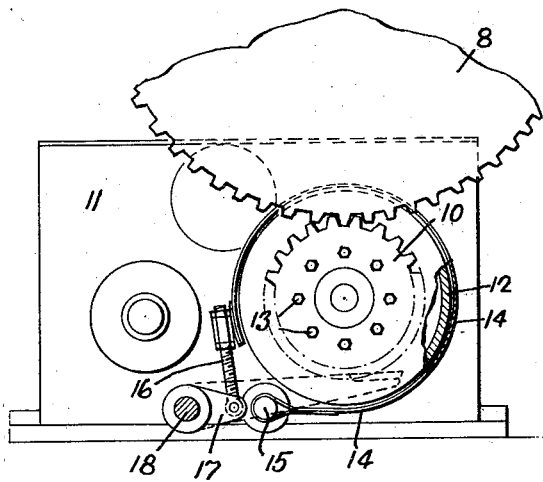
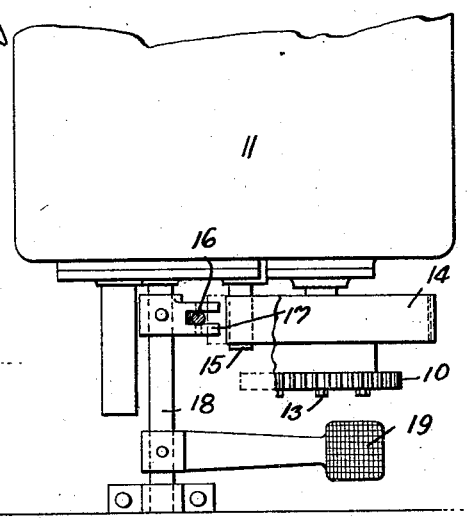
INVENTOR.
Louis G. Merritt,
BY Mayer, Warfield & Watson
ATTORNEYS.

Patented Apr. 8, 1930

1,753,384

UNITED STATES PATENT OFFICE

LOUIS G. MERRITT, OF LOCKPORT, NEW YORK, ASSIGNOR TO MERRITT ENGINEERING & SALES COMPANY, INC., OF LOCKPORT, NEW YORK, A CORPORATION OF NEW YORK

GEAR-BOX BRAKE

Application filed November 4, 1926. Serial No. 146,133.

This invention relates to lathes, and specifically, aims to provide an improved mechanism whereby power dogging may be accomplished in a more desirable manner than heretofore.

It is an object of the invention to construct a mechanism whereby a lathe—for example, a veneer lathe—may perform certain operations with greater facility and effectiveness than heretofore, and wherein the gripping or dogging of the work may at all times be readily controlled by the operator.

It is a further object to provide such a mechanism which will include relatively few and simple parts and which mechanism may be readily actuated.

A still further object of this invention is that of providing a mechanism for use in connection with lathes by means of which the mechanisms heretofore utilized may be simplified, and the strength, and weight of which may be reduced appreciably.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Figure 1 is a partly sectional side elevation of a power transmission and brake embodying one form of the present invention;

Fig. 2 is a sectional view taken along the lines 2—2 and in the direction of the arrows of Fig. 1; and Fig. 3 is a plan view of this mechanism.

For a detailed showing of the lathe construction which may be utilized, reference may be had to Letters Patent No. 699,547, issued to L. G. Merritt on May 6, 1902; and for the type of power transmission which may be employed for performing the log-rotating and dogging operations, reference is had to Letters Patent No. 1,543,678, issued to L. G. Merritt on June 30, 1925. At this time it is to be understood that while in the present application gears have been shown and described by way of illustration for performing the driving operations, any non-slipping type of drive such as, for example, a worm or chain and sprocket gear may be employed in lieu thereof, and the term "toothed gear" is used hereinafter in this generic sense.

Thus, in the foregoing views the numeral 5 indicates the bed of a veneer lathe, which mounts a spindle 6 turned by a log-rotating gear 7 suitably connected therewith, and this spindle being moved axially by means of a dogging gear 8. These gears are operated by means of gears 9 and 10, respectively, mounted upon shafts extending from within a power transmission enclosed in a suitable case 11.

In mechanisms of this character some difficulty has been experienced in providing driving mechanism sufficiently powerful to perform efficiently the dogging operation without the likelihood of such mechanism becoming damaged in the hands of an inexperienced operator. Furthermore, it sometimes becomes necessary to dog the log during the rotation thereof, it being desirable that the latter operation be not interrupted for the purpose of accomplishing the former. This makes it necessary for the gear to be driven through the transmission so as to effect a rotation of the gear 8 and the nut carried thereby with respect to the spindle 6. In view of the fact that such rotation is in a direction reverse to the direction in which the spindle is being rotated by means of the gear 7, it follows that the dogging operation under such conditions will be accomplished at a relatively great speed, and, as a consequence, a corresponding strain will be thrown upon the driving parts of the power transmission, resulting in their damage.

According to the present invention it is proposed that before the spindle is rotated an operator may initially dog the log by simply applying power to the shaft supporting the gear 10 to operate the gear 8 and feed the spindle axially. With the log supported by the spindles of the lathe, if it becomes necessary to more tightly grip the log prior to bringing the knife into contact with the latter, this may be readily accomplished by simply setting the gear 9 in operation to rotate the spindles and to retain the gear 8 against movement so that relative rotation occurs between the nut secured to the latter and the cooperating screw-threaded portion of the spindle. Accordingly, the spindle will be moved axially under the full power of the main drive of the lathe, and upon the log being dogged sufficiently the gear 8 may be permitted to move with the spindle, which will prevent further axial movement of the latter. Likewise, if during the log-rotating operation it is desired to dog the log without interrupting the former operation, this may be accomplished readily by again retaining the gear 8 against rotation.

In order properly to accomplish this result a brake drum 12 is secured to the shaft which mounts the gear 10, movement between these elements being prevented in any desired manner, as for example, by the use of bolts 13. Any convenient form of brake band 14 encircles the drum and may have one of its ends supported by a stud 15, its opposite end being adjustably connected as at 16 to a crank 17 extending from an operating shaft 18. The latter may be moved by a pedal 19 conveniently situated with respect to the operating mechanism of the power transmission.

Thus, an operator, by simply constricting the band 14, will prevent movement of the gear 10, and, as a consequence, retain the gear 8 against movement so that during the rotation of the spindle the actions aforedescribed will follow. It is to be noted that by having the brake in direct association with the shaft supporting the gear 10 a comparatively small and readily operated brake may be employed, in that the operator derives the benefit of the gear reduction between the gears 10 and 8, and thus, a comparatively small amount of restraining force applied directly to the latter gear will be adequate to result in movement of the gear 8 with respect to the spindle 6.

Thus, among others, the objects of this invention have been accomplished, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A power transmission for lathes, including means for driving a lathe spindle-rotating mechanism, toothed-gear means for driving a mechanism for axially shifting the lathe spindle, and means cooperating with said last-named driving means to retain the same against movement.

2. In combination, a lathe spindle, mechanisms for rotating said spindle and shifting the same axially, power toothed-gear drives connected with each of said mechanisms for their operation, and means associated with one of said drives for retaining the same against movement.

3. In combination, a lathe spindle, mechanism for rotating said spindle and shifting the same axially, power toothed-gear drives connected with each of said mechanisms for their operation, and means cooperating with the spindle-shifting drive for retaining said drive and the mechanism connected therewith against movement.

4. In combination, a lathe spindle, mechanisms for rotating said spindle and shifting the same axially, power toothed-gear drives connected with each of said mechanisms for their operation, means associated with the drive of said shifting mechanism for maintaining the same inoperative, and means for accomplishing the function of such latter drive by operation of the other drive during the period of inoperativeness of said first drive.

5. In combination, a screw-threaded lathe spindle, means for rotating said spindle, a nut engaging the screw-threads thereof, means for rotating said nut, a drive operating to actuate said spindle-rotating means, a toothed-gear drive for actuating said nut-rotating means, and means cooperating with said toothed-gear drive for maintaining the same and said nut-rotating means against movement.

6. In combination, a screw-threaded lathe spindle, means for rotating said spindle, a nut engaging the screw-threads thereof, means for rotating said nut, a reduction drive for actuating said spindle-rotating means, a reduction toothed-gear drive for operating said nut-rotating means, and means associated with said toothed-gear drive and cooperating therewith to prevent a movement thereof and a movement of said nut-rotating means.

7. In combination, a lathe spindle, means for rotating the same, means for shifting said spindle axially, a drive for operating said spindle-rotating means, a reduction toothed-gear drive for actuating said spindle-shifting means, and means connected directly with said toothed-gear drive for retaining the same against movement.

8. In combination, a lathe and a power transmission therefor, a spindle, mechanisms for rotating said spindle and shifting the same axially, said mechanisms and spindle forming a part of said lathe, reduction toothed-gear drives forming a part of said power transmission and connected one with each of said mechanisms, and a brake associated with the drive cooperating with the spindle-shifting mechanism for maintaining said drive and mechanism against movement.

9. In combination, a lathe and a power transmission therefor, a spindle and mechanisms for rotating and axially shifting said spindle forming a part of said lathe, shafts extending from said transmission and being toothed-geared with said mechanisms to provide reduction drives therefor, and a brake associated with the drive shaft of the gear of the spindle-shifting mechanisms.

10. In a device of the character described, a power transmission, including a plurality of drive shafts carrying toothed-gears to be connected with mechanisms to be operated, and a brake associated with one of said drive shafts.

11. In combination, a screw-threaded lathe spindle, means for rotating said spindle, a nut engaging the screw-threads thereof, toothed-gear means for rotating said nut, a selective power transmission having a plurality of drive-shafts extending therefrom, means operatively connecting one of said drive-shafts with said spindle-rotating means, toothed-gear means connecting another of said drive-shafts with said nut-rotating means, and a brake drum mounted upon said last-mentioned drive-shaft and having a brake associated therewith to prevent movement thereof and of said nut-rotating means.

12. In combination, two power-driven shafts, a spindle rotatable by one of said shafts, shifting-means operated by rotation of the spindle for shifting said spindle axially, reduction-gearing operatively connecting the other shaft with said shifting-means for rendering the latter inoperative, a braking-surface carried by the last-named shaft, and a brake applicable at will against said surface for holding the shaft stationary and thereby rendering said shifting-means operative.

In testimony whereof I affix my signature.
LOUIS G. MERRITT.